US012552642B2

(12) United States Patent
Strebel

(10) Patent No.: US 12,552,642 B2
(45) Date of Patent: Feb. 17, 2026

(54) DOOR SEAL FOR AN ELEVATOR CAR

(71) Applicant: Inventio AG, Hergiswil (CH)

(72) Inventor: Rene Strebel, Sarmenstorf (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/845,932

(22) PCT Filed: Mar. 7, 2023

(86) PCT No.: PCT/EP2023/055636

§ 371 (c)(1),
(2) Date: Sep. 11, 2024

(87) PCT Pub. No.: WO2023/174735

PCT Pub. Date: Sep. 21, 2023

(65) Prior Publication Data

US 2025/0178869 A1 Jun. 5, 2025

(30) Foreign Application Priority Data

Mar. 18, 2022 (EP) .................................... 22162881

(51) Int. Cl.
*B66B 13/30* (2006.01)

(52) U.S. Cl.
CPC .................................. *B66B 13/308* (2013.01)

(58) Field of Classification Search
CPC ...... B66B 13/30; B66B 13/308; E04B 1/6813
See application file for complete search history.

(56) References Cited

U.S. PATENT DOCUMENTS

| | | | | |
|---|---|---|---|---|
| 4,150,509 A * | 4/1979 | Knap | B61D 19/02 49/411 |
| 5,085,293 A * | 2/1992 | Aime | E04B 1/6813 187/400 |
| 5,181,241 A | 1/1993 | Strobel et al. | |
| 7,578,097 B2 * | 8/2009 | Dondlinger | F25D 23/087 49/118 |

FOREIGN PATENT DOCUMENTS

| | | |
|---|---|---|
| DE | 69112310 T2 | 4/1996 |
| DE | 69113176 T2 | 5/1996 |
| EP | 1428785 A1 | 6/2004 |
| JP | H06312890 A * | 11/1994 |

(Continued)

*Primary Examiner* — Diem M Tran
(74) *Attorney, Agent, or Firm* — Shumaker, Loop & Kendrick, LLP

(57) ABSTRACT

A door seal for an elevator car includes a first tube and a second tube made of an elastically deformable sealing material; the door seal adapted to be mounted on a car wall and/or car door of the elevator car such that the first and second tubes, when the door closes a door opening in the car wall, lie opposite one another within a door gap in a bridging direction and run at least partially around the door opening. The first tube has a pressure connection and can be deformed, by applying fluid pressure, between an initial shape and a final shape that is enlarged in the bridging direction compared to the initial shape. The second tube has at least one pressure equalization opening that enables pressure equalization between an interior and an environment of the second tube when the second tube is compressed.

17 Claims, 3 Drawing Sheets

(56) References Cited

FOREIGN PATENT DOCUMENTS

| | | | | | |
|---|---|---|---|---|---|
| JP | 2005029332 | A | | 2/2005 | |
| JP | 6897698 | B2 | | 7/2021 | |
| KR | 20230045422 | A | * | 4/2023 | ........... B66B 13/308 |
| WO | WO-2015004799 | A1 | * | 1/2015 | ........... B66B 13/308 |
| WO | 2019171412 | A1 | | 9/2019 | |

* cited by examiner

DOOR SEAL FOR AN ELEVATOR CAR

FIELD

The present invention relates to a door seal for an elevator car. Furthermore, the invention relates to a method for controlling an elevator system, to a control unit, a computer program and a computer-readable medium for carrying out the method, as well as to an elevator system.

BACKGROUND

An elevator car, for example for transporting persons or goods in buildings, usually comprises a car wall with a door opening and a door for closing the door opening, wherein the door, when it closes the door opening, is separated from the car wall by a horizontal door gap. In order to avoid air noise or vibrations of the door during the travel of the elevator car, this door gap can be bridged by means of a door seal adjustable in its height. The transverse forces that the door seal, in an active state, exerts on the door should not be too great.

U.S. Pat. No. 5,085,293, for example, describes an inflatable door seal which, in an inflated state, seals a gap between a wall of an elevator shaft and a wall of an elevator car. WO 2019 171 412 A1 and JP 2005 029 332 A also disclose inflatable door seals with one chamber. A lot of pressure may be necessary to inflate the seals safely. The high pressure can lead to large transverse forces on the door.

SUMMARY

There may therefore be a need for an improved door seal for an elevator car, which, in the active state, enables sufficient sealing of the door gap without subjecting the door to excessive transverse forces. Furthermore, there may be a need for a corresponding method for controlling an elevator system, a corresponding control unit, a corresponding computer program, a corresponding computer-readable medium and a corresponding elevator system.

These needs can be met by the subject matter of the advantageous embodiments defined in the following description, as well as the accompanying drawings.

A first aspect of the invention relates to a door seal for an elevator car, wherein the elevator car comprises a car wall with a door opening and a door for closing the door opening, wherein the door, when it closes the door opening, is separated from the car wall by a door gap to be sealed. The door seal comprises at least a first tube and a second tube made of an elastically deformable sealing material. The door seal can be mounted on the car wall and/or the door in such a way that the first tube and the second tube, when the door closes the door opening, lie opposite each other within the door gap in a bridging direction in which the door seal is intended to bridge the door gap and run at least partially around the door opening. The first tube has a pressure connection for applying a fluid pressure to the first tube and is deformable, by changing the fluid pressure, between an initial shape and a final shape that is enlarged in the bridging direction compared to the initial shape. The second tube has at least one pressure equalization opening which is designed to enable pressure equalization between an interior and an environment of the second tube when the second tube is compressed.

The door seal makes it possible to limit the transverse forces acting on the door in the active state of the door seal in such a way that the door gap is adequately sealed on the one hand, and excessive strain on the door mechanism is avoided on the other. This allows premature wear of the door mechanism as a result of repeated excessive transverse loading to be prevented. Thanks to the reduced transverse load, the door mechanism could also be manufactured less complexly and therefore more cheaply from the outset.

For example, the door can have different (horizontal) distances to the car wall in different portions of the door gap. This can be the case with a telescopic sliding door, the displaceably mounted door leaves of which are usually offset horizontally from one another. In addition, the horizontal distances between the door leaves may vary due to inaccuracies in manufacturing and/or assembly.

With conventional inflatable door seals, the contact pressure with which the door seal is pressed against the door or car wall is usually set to a value at which the door seal just closes the door gap in the region of its largest width (e.g., 6 mm), possibly plus a certain reserve in the event that the door gap has different widths in different regions and the door seal is to bridge the door gap simultaneously in the region of its smallest width (e.g. 3 mm) and in the region of its largest width. Due to the contact pressure, high transverse forces can act on the door or car wall, in particular in the region of the smallest width of the door gap.

By contrast, the approach presented here offers the advantage that the transverse load on the door or car wall in the region of the smallest width of the door gap is greatly reduced by determining the transverse forces by the second tube, which can be compressed with comparatively little force. Nevertheless, the door gap can be adequately sealed in the region of its greatest width.

A second aspect of the invention relates to a method for controlling an elevator system, wherein the elevator system comprises an elevator shaft and an elevator car movable in the elevator shaft, wherein the elevator car comprises a car wall with a door opening, a door for closing the door opening and the door seal described above and below, wherein the door, when it closes the door opening, is separated from the car wall by a door gap that is to be sealed, and wherein the door seal is mounted on the car wall and/or the door in such a way that the first tube and the second tube, when the door closes the door opening, lie opposite one another within the door gap in the bridging direction and run at least partially around the door opening. The elevator system further comprises a pressure supply unit connected to the pressure connection for providing the fluid pressure. The method comprises at least the following steps:

- if it is detected that the door seal is to be activated, i.e. the door gap is to be sealed: generating a first control signal for controlling the pressure supply unit so that the fluid pressure in the first tube reaches a first value at which the first tube assumes the final shape, wherein the first tube in the final shape is enlarged in the bridging direction compared to the initial shape at least to such an extent that the door seal bridges the door gap;
- if it is detected that the door seal is to be deactivated, i.e. the door gap is to be opened: generating a second control signal to control the pressure supply unit so that the fluid pressure in the first tube reaches a second value at which the first tube returns to its original shape.

The method can be carried out automatically by a processor.

The pressure supply unit can, for example, comprise a pneumatic and/or hydraulic pump for pumping a gas or a liquid. In addition, the pressure supply unit may comprise at least one controllable valve for controlling the fluid pressure in the first tube. The pressure supply unit can, for example, be installed in the elevator car.

A third aspect of the invention relates to a control unit which comprises a processor that is configured to carry out the method described above and below. The control unit can comprise hardware and/or software modules. In addition to the processor, the control unit can comprise a memory and data communication interfaces for data communication with peripheral devices. The control unit can, for example, be connected to a higher-level elevator control for data communication or be part of such an elevator control. Alternatively, the control unit can be a door control unit for controlling the door of the elevator car.

Features of the method can also be interpreted as features of the control unit, and vice versa.

A fourth aspect of the invention relates to an elevator system comprising an elevator shaft and an elevator car movable in the elevator shaft, the elevator car comprising a car wall with a door opening, a door for closing the door opening and the door seal described above and below, wherein the door, when it closes the door opening, is separated from the car wall by a door gap that is to be sealed, and wherein the door seal is mounted on the car wall and/or the door in such a way that the first tube and the second tube, when the door closes the door opening, lie opposite one another within the door gap in the bridging direction and run at least partially around the door opening. Furthermore, the elevator system comprises a pressure supply unit connected to the pressure connection for providing the fluid pressure, and the control unit described above and below.

Further aspects of the invention relate to a computer program and a computer-readable medium on which the computer program is stored.

The computer program comprises commands which cause a processor to carry out the method described above and below when the computer program is executed by the processor.

The computer-readable medium can be a volatile or non-volatile data memory. For example, the computer-readable medium can be a hard disk, a USB memory device, a RAM, ROM, EPROM, or flash memory. The computer-readable medium can also be a data communication network that enables a program code to be downloaded, such as the Internet or a data cloud.

Features of the method described above and below can also be interpreted as features of the computer program and/or of the computer-readable medium, and vice versa.

Without restricting the scope of the invention in any way, embodiments of the invention may be considered to be based on the concepts and findings described below.

The tubes can be made of the same or different sealing materials. The sealing material can, for example, be an elastomer, in particular an elastomer comprising a silicone compound.

For example, the final shape can be enlarged by 1 mm to 10 mm in the bridging direction compared to the initial shape. Depending on the (largest or smallest) width of the door gap, other size deviations between the initial and final shape are, however, also possible.

The second tube can, for example, be elastically compressible transversely to its longitudinal direction, i.e., be compressible in such a way that, in the compressed state, it is prestressed with a restoring force acting in the direction of its (uncompressed) basic shape. This allows the second tube to return to its basic shape on its own when no more compression force is applied to it.

The second tube can, for example, be compressed to different degrees in different longitudinal portions when the door seal is in the active state. This allows fluctuations in the width of the door gap to be compensated without the door or car wall being excessively subjected to pressure and/or bending.

The tubes may have the same cross-sectional shape and/or size in the unloaded state, or they may differ from one another in their cross-sectional shape and/or size. For example, the first tube may have an elliptical cross-section, and the second tube may have a circular cross-section (or vice versa). A box- or teardrop-shaped cross-section of the first and/or second tube is also possible.

In the simplest case, the pressure equalization opening can be an open end of the second tube. Alternatively, the pressure equalization opening can be an opening in a lateral surface of the second tube.

According to one embodiment, the first tube and the second tube can be connected to each other to form a tube assembly. The tube assembly can, for example, be manufactured by extrusion from one and the same sealing material. However, it is also possible that the second tube is made of a different, in particular softer, sealing material than the first tube and/or the rest of the tube assembly. These embodiments enable inexpensive production and easy (dis)mounting of the door seal.

According to one embodiment, the tube assembly can be mounted on the car wall in such a way that the first tube runs between the second tube and the car wall. Alternatively, the tube assembly can be mounted on the door in such a way that the first tube runs between the second tube and the door. The (dis)mounting of the door seal can thus be further simplified. In particular, this can facilitate the connection of the first tube to the pressure supply unit.

The first and second tubes, however, can also be designed as individual tubes that can be mounted separate from each other. For example, in this case the first tube can be mounted on the car wall and the second tube on the door (or vice versa).

According to one embodiment, the second tube can have a plurality of pressure equalization openings distributed in its longitudinal direction. In particular, a lateral surface of the second tube can have several pressure equalization openings. For example, the pressure equalization openings can be arranged in several rows on opposite sides of the second tube. In this way, the force required to compress the second tube can be further reduced.

According to one embodiment, the first tube can be elastically deformable such that it is prestressed in the final shape with a restoring force acting in the direction of the initial shape. The elastic spring properties of the first tube can be achieved, for example, by choosing a suitable sealing material and/or a suitable cross-sectional shape. This causes the first tube to return to its original shape on its own when the pressure between the interior and the surroundings of the first tube equalizes.

According to one embodiment, the first tube in its initial shape may have an elliptical cross-section. This can avoid excessive stretching of the first tube. This can improve the durability of the door seal.

According to one embodiment, a longitudinal direction of the elliptical cross-section in the assembled state of the door seal can run obliquely or orthogonally to the bridging direction. The longitudinal direction of the elliptical cross-section can correspond to a main axis of its elliptical shape. This has the advantage that the first tube in the final shape is prestressed with a restoring force acting in the direction of the initial shape without being stretched excessively. The durability of the door seal can thus be improved.

According to one embodiment, the first tube can have an elongate first profile on its outer surface, which profile is designed to engage in a form-fitting and/or frictionally engaged manner in an elongate first profile receptacle of the elevator car. The first tube and the first profile can, for example, have longitudinal directions parallel to each other. The first profile can, for example, be made from the same sealing material and/or in the same manufacturing step as the first tube and/or the tube assembly.

Additionally or alternatively, the second tube can have an elongate second profile on its outer surface, which profile is designed to engage in a form-fitting and/or frictionally engaged manner in an elongate second profile receptacle of the elevator car. The second tube and the second profile can, for example, have longitudinal directions parallel to each other. The second profile can, for example, be made from the same sealing material and/or in the same manufacturing step as the second tube and/or the tube assembly.

This simplifies the (dis)mounting of the tube in question. In addition, such profiles can be manufactured very cost-effectively by extrusion together with the particular tube.

According to one embodiment, an outer surface of the first tube and/or of the second tube can have a static-friction-reducing structure in a contact portion which contacts the door and/or the car wall in the sealed state of the door gap. The structure can, for example, be formed by a plurality of elongate elevations of which the longitudinal directions can be parallel to each other and/or to the longitudinal direction of the door seal. However, other static friction-reducing structures are also possible, such as grid-like or knob-like structures. In this way, unwanted adhesion of the door seal to the door or car wall can be avoided in an active state of the door seal.

According to one embodiment, a difference between the first and the second value can be 0.5 bar to 1.5 bar. Such a range of values has proven to be particularly suitable in practice in tests with typical door gap dimensions.

Advantageous embodiments of the invention will be described below with reference to the accompanying drawings, wherein neither the drawings nor the description are intended to be interpreted as limiting the invention.

The drawings are merely schematic, and not to scale. Like reference signs refer in different drawings to like or analogous features.

DETAILED DESCRIPTION

Figure 1:
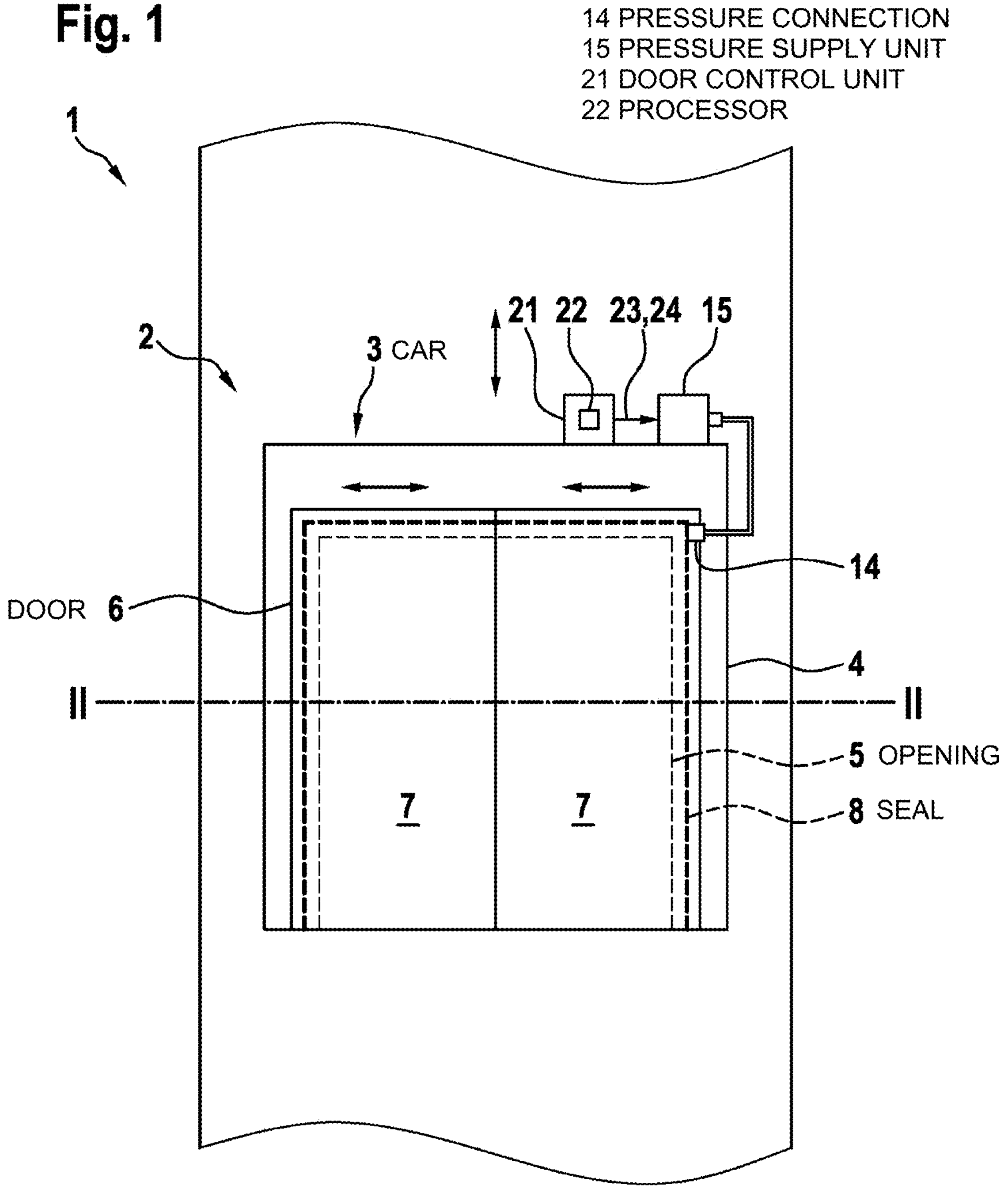
FIG. 1 shows an elevator system according to one embodiment of the invention.

FIG. 1 shows an elevator system 1 which comprises an elevator shaft 2 and an elevator car 3 movable vertically in the elevator shaft 2 between different floors (not shown). The elevator car 3 comprises a car wall 4 with a door opening 5 through which the elevator car 3 can be entered from the floors. The door opening 5 can be closed by means of a door 6, here for example a sliding door with two door leaves 7 movable relative to each other in opposite horizontal directions.

FIG. 1 shows the elevator car 3 in the closed state in which the door 6 closes the door opening 5 with its two door leaves 7.

A door seal 8 runs around the door opening 5, more precisely to the left, right and above the door opening 5, and, in the active state, seals a horizontal door gap 9 (see FIG. 2 and FIG. 3) between the car wall 4 and the door leaves 7.

As can be seen in FIG. 2, FIG. 3, FIG. 4 and FIG. 5, the door seal 8 comprises a first tube 10 and a second tube 11 made of an elastically deformable sealing material, for example an elastomer such as EPDM, MVQ, silicone or VMQ.

Figure 4:
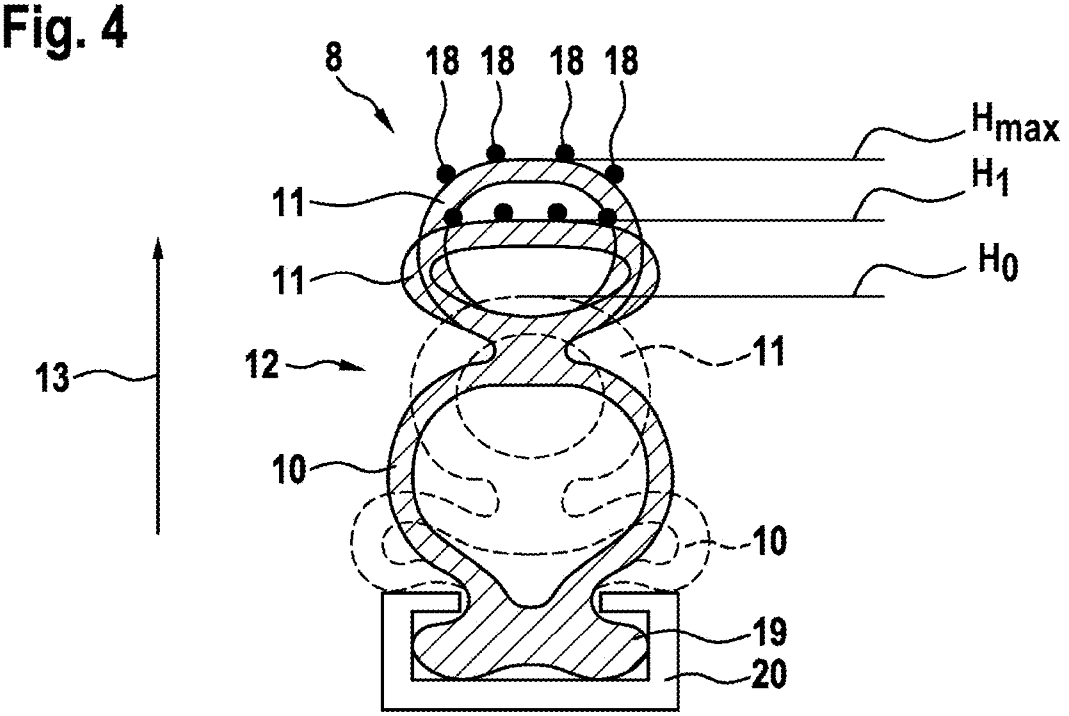
FIG. 4 shows a cross-sectional view of a door seal according to an embodiment of the invention in different states.
Figure 5:
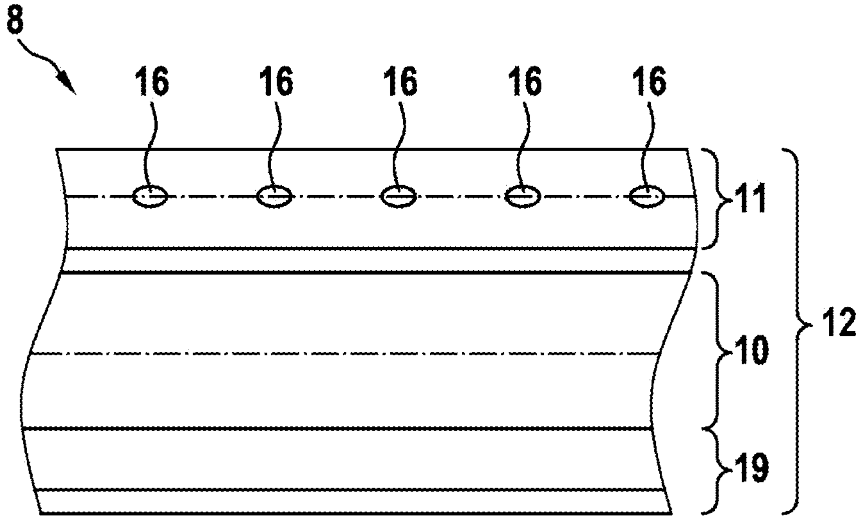
FIG. 5 shows a side view of a door seal according to an embodiment of the invention.

The two tubes 10, 11 can, for example, be connected to one another to form a tube assembly 12 (see FIG. 4 and FIG. 5). Alternatively, the two tubes 10, 11 can be individual tubes that can be mounted separately from each other.

In this example, the door seal 8 is mounted on the car wall 4 in such a way that the two tubes 10, 11 are at least partially opposite each other in a (horizontal) bridging direction 13 in which the door seal 8 is intended to bridge the door gap 9 in the active state of the door seal 8.

Alternatively, the door seal 8 can be mounted on the door 6 and movable therewith.

The positions of the two tubes 10, 11 with respect to the bridging direction 13 can also be swapped.

The first tube 10 has a pressure connection 14 (see FIG. 1) which is fluidically connected to a pressure supply unit 15 for providing a fluid pressure, for example in the form of compressed air. The pressure supply unit 15 may comprise an electrically controllable pneumatic valve for controlling the fluid pressure.

By changing the fluid pressure within the first tube 10, the tube can be deformed between an initial shape (see FIG. 3) and a final shape (see FIG. 2) larger in the bridging direction 13 compared to the initial shape.

The second tube 11, however, is not connected to the pressure supply unit 15. Instead, the second tube 11 comprises at least one pressure equalization opening 16, for example a plurality of lateral pressure equalization openings 16, which can be arranged distributed over a longitudinal portion of the second tube 11 or its entire length (see FIG. 5).

The pressure equalization opening(s) 16 enables (enable) pressure equalization between a cavity of the second tube 11 and its surroundings whenever the second tube 11 is compressed horizontally during activation of the door seal 8. Thus, the transverse load on the door 6, i.e., the door leaves 7, can be significantly reduced by the door seal 8 in the active state. In addition, fluctuations in the width of the door gap 9, for example due to horizontally offset door leaves 7 (e.g., in the case of a telescopic sliding door) or due to inaccuracies in production and/or assembly, can be compensated for without the door seal 8 placing excessive and/or varying loads on the door leaves 7.

Figure 2:
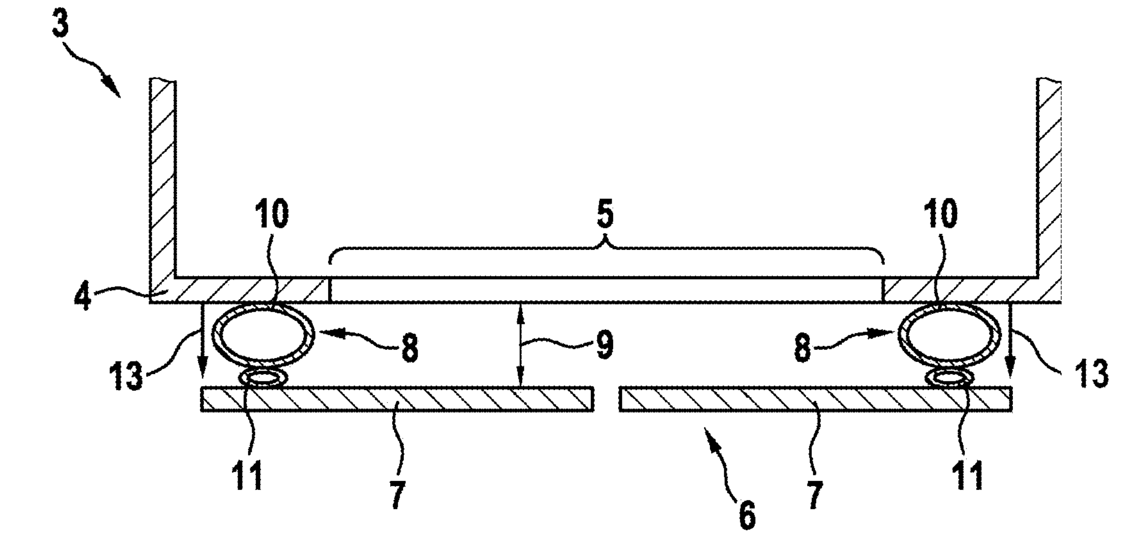
FIG. 2 shows a cross-sectional view of a portion of an elevator car from FIG. 1 with a door seal according to an embodiment of the invention in the active state.

FIG. 2 shows the active state of the door seal 8 in which the first tube 10 is inflated to such an extent that the second tube 11 touches the door leaves 7 opposite the car wall 4 with a contact portion of its outer surface. The second tube 11 can be compressed here to a greater or lesser extent. In the best case, the second tube 11 rests only lightly on the respective inner side of the door leaves 7 so that the door gap 9 is sealed, but the door leaves 7 are not significantly stressed by the door seal 8. Even if the second tube 11 is severely deformed, the door leaves 7 are still not significantly stressed by the door seal 8.

Figure 3:
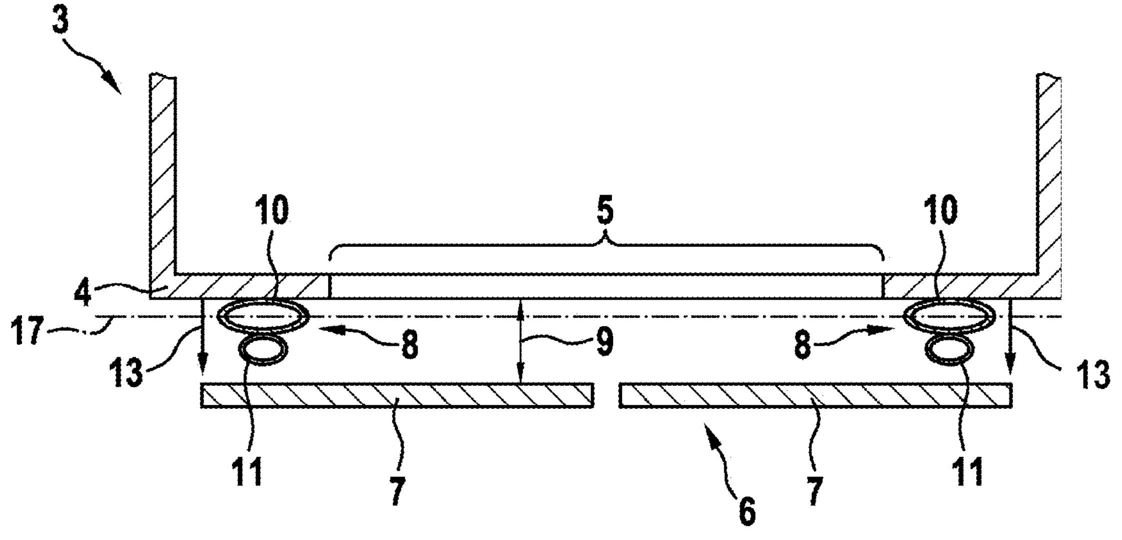
FIG. 3 shows a cross-sectional view of a portion of an elevator car from FIG. 1 with a door seal according to an embodiment of the invention in the inactive state.

FIG. 3 shows the inactive state of the door seal 8 in which the door gap 9 is released so that the door leaves 7 can be moved unhindered.

The first tube 10 can, for example in the initial shape, have an elliptical cross-section. This has the effect that the first tube 10 in the final shape is prestressed with a restoring force acting in the direction of the initial shape, i.e. opposite to the bridging direction 13, without being stretched excessively. This can improve the durability of the door seal 8.

As shown in FIG. 3, a main axis 17 of the elliptical shape (i.e. its longitudinal direction) can run orthogonal to the bridging direction 13. Thus, the stretching of the first tube 10 can be reduced to a minimum.

As shown in FIG. 4, the door seal 8 can have a static-friction-reducing structure 18 in the contact portion which is formed here by way of example by a portion of the outer surface of the second tube 11, which helps to prevent undesirable adhesion of the contact portion to the respective counterpart, here to the door leaves 7, in the active state of the door seal 8.

In this example, the structure 18 is formed by a plurality of elongate elevations on the outer surface, the longitudinal directions of which each run parallel to the longitudinal direction of the second tube 11. However, other structures that reduce static friction are also possible, such as grid-like or knob-like structures.

In addition, the tube assembly 12 shown in FIG. 4 and FIG. 5 is designed, for example, with an elongate first profile 19 for mounting the door seal 8 on the car wall 4, which profile extends along an outer surface of the first tube 10 facing away from the second tube 11 in the longitudinal direction thereof and, in the mounted state of the door seal 8, engages in a corresponding first profile receptacle 20 of the elevator car 3 in a force-fitting and/or frictionally engaged manner.

The first profile 19 can in particular be manufactured as part of the tube assembly 12, i.e., from the same material and/or in the same manufacturing step as the two tubes 10, 11.

The first profile receptacle 20 can be formed, for example, by a U- or C-shaped profile strip embedded in the car wall 4.

Alternatively, the second tube 11 can be designed in a corresponding manner with a second profile which can be connected in a corresponding manner in a frictionally engaged and/or form-fitting manner to a second profile receptacle of the elevator car 3. In FIG. 4, the elongate first profile 19 would replace the elevations structure 18.

FIG. 4 also shows different degrees of deformation of the door seal 8. In the inactive state (shown with dashed lines), the door seal 8 has its smallest height $H_0$ with respect to the bridging direction 13. However, the door seal 8 reaches its greatest height $H_{max}$ when the first tube 10 assumes the final shape, and the second tube 11 is hardly compressed. Fluctuations in the width of the door gap 9 can be compensated by compressing the second tube 11 in and/or against the bridging direction 13, while the first tube 10 retains the final shape, to such an extent that the door seal 8 has an intermediate height $H_1$, between the smallest height $H_0$ and the largest height $H_{max}$, sufficient to seal the door gap 9.

A difference between $H_0$ and $H_{max}$ can, for example, be 5 mm to 10 mm.

For example, a difference between $H_1$ and $H_{max}$ can be 5 mm or less.

Basically, the door seal 8 can be divided into three portions:

- a base portion for fixing to a corresponding counterpart, in particular for mechanical fixing and/or bonding;
- a pressure portion which can be supplied with compressed air to inflate the door seal 8;
- a compensation portion with at least one pressure equalization opening 16 which can be compressed with little force and which can compensate for any lateral offset of the two door leaves 7.

It is possible that the compensation portion, i.e., the second tube 11 forming the compensation portion, is made of a softer material than the rest of the door seal 8. Thus, the transverse load acting on the door leaves 7 can be further reduced due to the improved force-displacement ratio.

The distance between the door seal 8 and the surface of the car wall 4 can be set to the following values, for example, according to EN81-20:

- $H_0$: 0 mm distance, i.e., the door seal 8 is flush with the car wall 4 and allows the door 6 to pass through without restriction;
- $H_1$: 3 mm distance (this corresponds to the smallest permissible gap between the door 6 and the car wall 4);
- $H_{max}$: 6 mm distance (this corresponds to the largest permissible gap between the door 6 and the car wall 4).

The fluid pressure for activating the door seal 8 can be adjusted so that the door seal 8 is extended to the height $H_{max}$. This ensures that the door seal 8 completely bridges the door gap 9 in all cases. In addition, a certain reserve pressure can be provided.

The pressure supply unit 15 is coupled to a control unit 21 (see FIG. 1), for example a door control unit of the elevator car 3, which comprises a processor 22 which is configured to carry out a method described below for controlling the elevator system 1, more precisely for activating or deactivating the door seal 8, by executing a computer program stored in a memory of the control unit 21.

For this purpose, the control unit 21 generates a first control signal 23 in a first step when it has detected that the door seal 8 is to be activated, i.e., the door gap 9 is to be sealed. This may be the case, for example, shortly after closing the door 6. The first control signal 23 causes the pressure supply unit 15 to change the fluid pressure in the first tube 10, in particular to increase it to such an extent that it reaches a first value at which the first tube 10 assumes the final shape. Thus, the door seal 8 rests with the contact portion on the door leaves 7 and seals the door gap 9.

If, however, the control unit 21 detects that the door seal 8 is to be deactivated again, i.e., the door gap 9 is to be opened again (which can be the case, for example, during travel shortly before stopping the elevator car 3 at a floor), it generates a second control signal 24 which causes the pressure supply unit 15 to change the fluid pressure in the first tube 10, in particular to reduce it to such an extent that it reaches a second value at which the first tube 10 resumes the original shape, i.e., at which the door seal 8 again has its smallest height $H_0$, so that the door seal 8 is separated from the door leaves 7 by a sufficient air gap in good time before the opening of the door 6.

A difference between the first and the second value can, for example, be 0.5 bar to 1.5 bar.

Finally, it should be noted that terms such as "having," "comprising," etc. do not exclude other parts or steps, and indefinite articles such as "a" or "an" do not exclude a plurality. Furthermore, it is noted that features or steps described with reference to one of the preceding embodiments can also be used in combination with features or steps described with reference to other of the above embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A door seal for an elevator car, the elevator car having a car wall with a door opening formed therein and a door for closing the door opening, wherein when the door closes the door opening the door is separated from the car wall by a door gap, the door seal comprising:

a first tube made of an elastically deformable sealing material forming an enclosed profile;

wherein the first tube has a pressure connection for applying a fluid pressure to an interior of the first tube to deform the first tube by changing the fluid pressure, the first tube being deformable between an initial shape and a final shape enlarged in a bridging direction compared to the initial shape, the bridging direction extending horizontally across the door gap;

a second tube made of an elastically deformable sealing material forming an enclosed profile separate from the enclosed profile of the first tube;

wherein the door seal is adapted to be mounted on the car wall and/or on the door such that, when the door closes the door opening, the first tube lies opposite the second tube within the door gap in the bridging direction and the first tube and the second tube run at least partially around the door opening; and wherein the second tube has at least one pressure equalization opening formed therein enabling pressure equalization between an interior of the second tube and an environment of the second tube when the second tube is compressed.

2. The door seal according to claim 1 wherein the first tube and the second tube are connected to each other forming a tube assembly.

3. The door seal according to claim 2 wherein the tube assembly is adapted to be mounted on the car wall such that the first tube runs between the second tube and the car wall, or is adapted to be mounted on the door such that the first tube runs between the second tube and the door.

4. The door seal according to claim 1 wherein the second tube has a plurality of the pressure equalization opening distributed in a longitudinal direction of the second tube.

5. The door seal according to claim 1 wherein the first tube is elastically deformable such that the first tube is prestressed in the final shape with a restoring force acting in a direction of the initial shape.

6. The door seal according to claim 1 wherein the first tube has an elliptical cross-section in the initial shape.

7. The door seal according to claim 6 wherein a longitudinal direction of the elliptical cross-section in the mounted state of the door seal runs obliquely or orthogonally to the bridging direction.

8. The door seal according to claim 1 wherein the first tube has an elongate first profile formed on an outer surface, the first profile adapted to engage form-fittingly and/or frictionally in an elongate first profile receptacle of the elevator car, and/or wherein the second tube has an elongate second profile formed on an outer surface, the second profile adapted to engage form-fittingly and/or frictionally in an elongate second profile receptacle of the elevator car.

9. The door seal according to claim 1 wherein an outer surface of the first tube and/or an outer surface of the second tube has a static-friction-reducing structure in a contact portion that contacts the door and/or the car wall when the first tube is in the final shape sealing the door gap.

10. A method for controlling an elevator system, the elevator system including an elevator shaft with an elevator car movable in the elevator shaft, wherein the elevator car has a car wall with a door opening formed therein and a door for closing the door opening, wherein when the door closes the door opening the door is separated from the car wall by a door gap that is to be sealed, the method comprising the steps of:

providing the door seal according to claim 1 wherein the door seal is mounted on the car wall and/or on the door such that when the door closes the door opening the first tube lies opposite the second tube within the door gap in the bridging direction and the first and the second tubes run at least partially around the door opening;

connecting a pressure supply unit to the first tube with the pressure connection to provide the fluid pressure to the interior of the first tube;

upon detecting that the door seal is to be activated, generating a first control signal to the pressure supply unit causing the fluid pressure in the first tube to reach a first value at which the first tube assumes the final shape, wherein the first tube in the final shape is enlarged in the bridging direction compared to the initial shape such that the door seal bridges the door gap; and upon detecting that the door seal is to be deactivated, generating a second control signal to the pressure supply unit causing the fluid pressure in the first tube reach a second value at which the first tube resumes the initial shape.

11. The method according to claim 10 wherein a difference between the first value and the second value is in a range of 0.5 bar to 1.5 bar.

12. A control unit including a processor adapted to control the elevator system to perform the method according to claim 10.

13. A computer program comprising commands stored on a non-transitory computer-readable medium that when executed by a processor of an elevator system cause the elevator system to perform the method according to claim 10.

14. A non-transitory computer-readable medium on which the computer program according to claim 13 is stored.

15. An elevator system comprising:

an elevator shaft;

an elevator car movable in the elevator shaft, the elevator car having a car wall with a door opening formed therein, a door for closing the door opening and the door seal according to claim 1, wherein when the door closes the door opening the door is separated from the car wall by the door gap that is to be sealed, and wherein the door seal is mounted on the car wall and/or on the door such that when the door closes the door opening the first tube lies opposite the second tube within the door gap in the bridging direction and the first tube and the second tube run at least partially around the door opening;

a pressure supply unit connected to the pressure connection for providing the fluid pressure to the interior of the first tube;

a control unit connected to the pressure supply unit;

wherein upon detecting that the door seal is to be activated, generating a first control signal from the control unit to the pressure supply unit causing the fluid pressure in the first tube to reach a first value at which the first tube assumes the final shape, wherein the first tube in the final shape is enlarged in the bridging direction compared to the initial shape such that the door seal bridges the door gap; and wherein upon detecting that the door seal is to be deactivated, generating a second control signal from the control unit to the pressure supply unit causing the fluid pressure in the first tube reach a second value at which the first tube resumes the initial shape.

16. A door seal for an elevator car, the elevator car having a car wall with a door opening formed therein and a door for closing the door opening, wherein when the door closes the door opening the door is separated from the car wall by a door gap, the door seal comprising:

a first tube made of an elastically deformable sealing material;

wherein the first tube has a pressure connection for applying a fluid pressure to an interior of the first tube to deform the first tube by changing the fluid pressure, the first tube being deformable between an initial shape and a final shape enlarged in a bridging direction compared to the initial shape, the bridging direction extending horizontally across the door gap;

a second tube made of an elastically deformable sealing material;

wherein the door seal is adapted to be mounted on the car wall and/or on the door such that, when the door closes the door opening, the first tube lies opposite the second tube within the door gap in the bridging direction and the first tube and the second tube run at least partially around the door opening; and wherein the second tube has a plurality of pressure equalization openings formed therein enabling pressure equalization between an interior of the second tube and an environment of the second tube when the second tube is compressed, the pressure equalization openings being distributed in a longitudinal direction of the second tube.

17. A door seal for an elevator car, the elevator car having a car wall with a door opening formed therein and a door for closing the door opening, wherein when the door closes the door opening the door is separated from the car wall by a door gap, the door seal comprising:

a first tube made of an elastically deformable sealing material surrounding a first interior;

wherein the first tube has a pressure connection for applying a fluid pressure to the first interior of the first tube to deform the first tube by changing the fluid pressure, the first tube being deformable between an initial shape and a final shape enlarged in a bridging direction compared to the initial shape, the bridging direction extending horizontally across the door gap;

a second tube made of an elastically deformable sealing material surrounding a second interior isolated from the first interior preventing fluid communication between the first interior and the second interior;

wherein the door seal is adapted to be mounted on the car wall and/or on the door such that, when the door closes the door opening, the first tube lies opposite the second tube within the door gap in the bridging direction and the first tube and the second tube run at least partially around the door opening; and wherein the second tube has at least one pressure equalization opening to an environment of the second tube formed therein enabling pressure equalization between the second interior of the second tube and the environment of the second tube when the second tube is compressed.

* * * * *